(12) United States Patent
Li et al.

(10) Patent No.: US 12,034,749 B2
(45) Date of Patent: Jul. 9, 2024

(54) ANAMOLY DETECTION SYSTEM FOR PERIPHERAL COMPONENT INTERCONNECT EXPRESS

(71) Applicant: Infineon Technologies AG, Neubiberg (DE)

(72) Inventors: Lin Li, Munich (DE); Varun Kumar, Unterhaching (DE); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 411 days.

(21) Appl. No.: 17/408,942

(22) Filed: Aug. 23, 2021

(65) Prior Publication Data
US 2023/0056018 A1 Feb. 23, 2023

(51) Int. Cl.
*H04L 9/40* (2022.01)
*G06F 13/42* (2006.01)

(52) U.S. Cl.
CPC ...... *H04L 63/1425* (2013.01); *G06F 13/4221* (2013.01); *H04L 63/1416* (2013.01); *H04L 63/1466* (2013.01); *H04L 63/166* (2013.01); *G06F 2213/0026* (2013.01)

(58) Field of Classification Search
CPC ............. H04L 63/1425; H04L 63/1416; H04L 63/1466; H04L 63/166; G06F 13/4221; G06F 2213/0026
USPC .......................................................... 726/22
See application file for complete search history.

(56) References Cited

U.S. PATENT DOCUMENTS

| | | | |
|---|---|---|---|
| 2007/0266179 A1* | 11/2007 | Chavan | G06F 13/4022 709/250 |
| 2009/0265784 A1* | 10/2009 | Waizumi | H04L 63/1425 703/2 |
| 2014/0112131 A1* | 4/2014 | Todaka | H04L 47/2433 370/230 |
| 2021/0124692 A1* | 4/2021 | Benisty | G06F 12/0246 |

* cited by examiner

*Primary Examiner* — Jacob Lipman
(74) *Attorney, Agent, or Firm* — Banner & Witcoff Ltd.

(57) ABSTRACT

A traffic anomaly detector of a Peripheral Component Interconnect express (PCIe) system, including filters configured to filter headers of PCIe transaction layer packets (TLPs) based on respective filter criterion; a classifier configured to trigger an event based on one of the filter criterion or a logical combination of a plurality of the filter criteria; an event counter configured to count a number of the events; and a processor configured to detect, based on a value of the event counter, an anomaly in the PCIe TLP traffic.

20 Claims, 3 Drawing Sheets

FIG 3

300
Example of Memory Write TLP

|  | Byte +0 | +1 | +2 | +3 |
|---|---|---|---|---|
| word 0 | Fmt / Type | R / TC / R | TD / EP / Attr / R | Length |
| word 1 | Requester ID | | Tag | Last BE / First BE |
| word 2 | Address [31:2] | | | R |
| word 3 | Data | | | |

FIG 4

400
Method of Detecting a Traffic Anamoly in a PCIe Network

410
Filtering, by filters, headers of PCIe transaction layer packets (TLPs) based on respective filter criterion.

420
Triggering, by a classifier, an event based on one of the filter criterion or a logical combination of a plurality of the filter criteria.

430
Counting, by an event counter, a number of the events.

440
Detecting, by a processor based on a value of the event counter, an anomaly in the PCIe TLP traffic.

ANAMOLY DETECTION SYSTEM FOR PERIPHERAL COMPONENT INTERCONNECT EXPRESS

BACKGROUND

Peripheral Component Interconnect express (PCIe) is a high-speed serial interface standard applied in personal computers, servers, and mobile devices. In a PCIe topology, many devices (endpoints) may be connected to a host (root complex) via a switch. The security of PCIe topology becomes a concern as many devices from different vendors, along with independent applications using PCIe, are integrated into a single system. In such integrated systems it is important to provide security between connected devices and software applications using these devices.

Attack methods vary among systems, requiring corresponding mechanisms to counter or avoid attacks. One approach is to continuously monitor traffic patterns and generate statistical information for assessing a current health of the PCIe network. Data rates of PCIe network are high, and thus software-only solutions may not meet performance and latency requirements.

BRIEF DESCRIPTION OF THE DRAWINGS

FIG. 3 illustrates an example of a memory write Transaction Layer Packet (TLP).

FIG. 4 illustrates a flowchart of a method of detecting a traffic anomaly in a PCIe network in accordance with aspects of the disclosure.

DETAILED DESCRIPTION

The present disclosure is directed to detecting traffic properties and creating corresponding metadata for evaluation by software. Thereafter, a host may respond in order maintain Peripheral Component Interconnect express (PCIe) network security.

Figure 1:
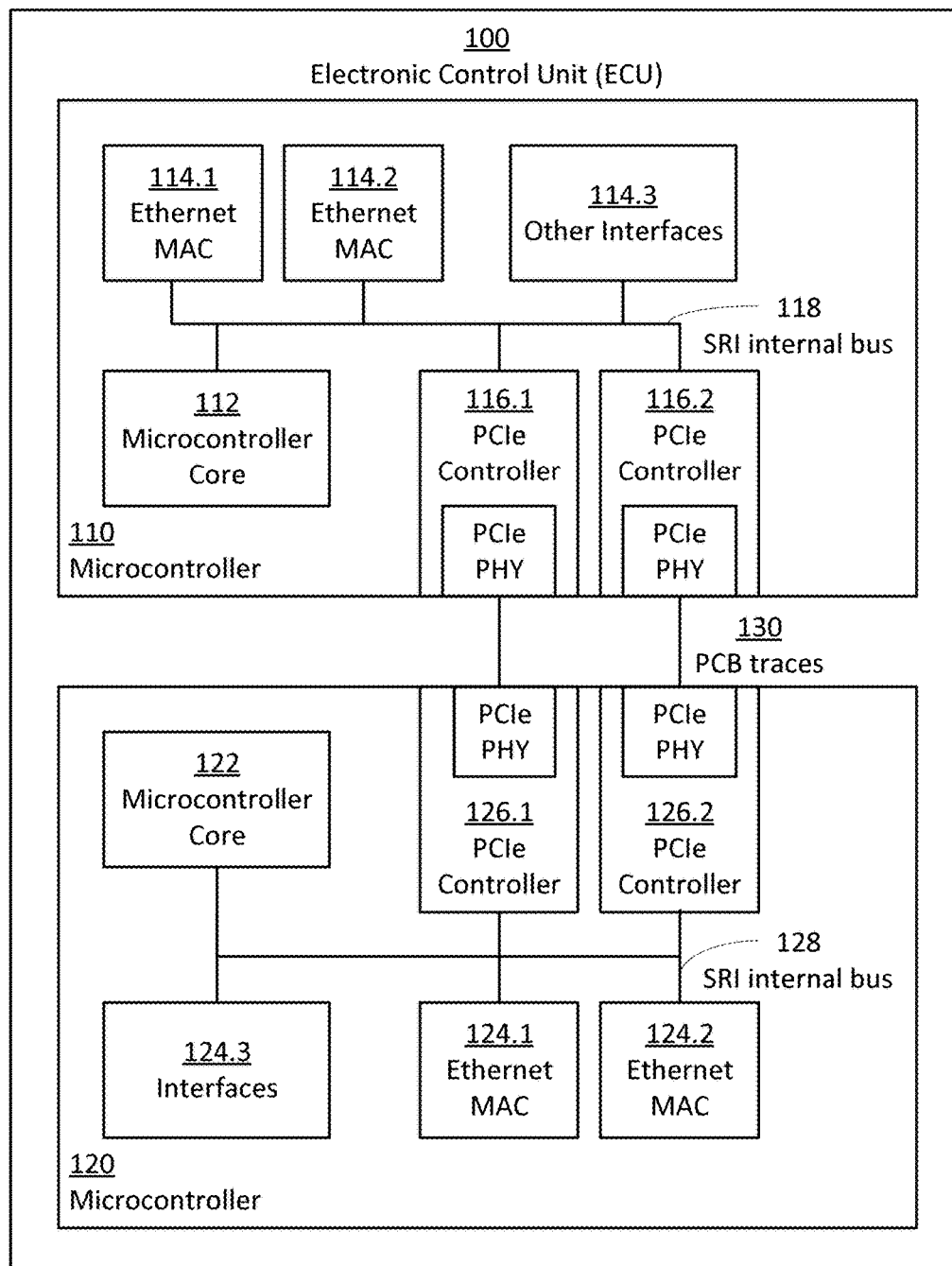
FIG. 1 illustrates a schematic diagram of an example automotive Electronic Control Unit (ECU) in which aspects of the disclosure may be applied.

FIG. 1 illustrates a schematic diagram of an example automotive Electronic Control Unit (ECU) 100 in which aspects of the disclosure may be applied.

The ECU 100 includes two microcontrollers 110, 120 coupled together via printed circuit board (PCB) traces 130. Each microcontroller 110, 120 includes a microcontroller core 112, 122, Ethernet media access controllers (MACs) 112, 124, other interfaces 114.3, 124.3, and PCIe controllers 116, 126. Each of the PCIe controllers 116, 126 includes a physical layer (PHY) coupled to the PCB traces 130. Ethernet MACs 112, 124 and PCIe controllers 116, 126 differ in that Ethernet MACs provide streams to its data whereas PCIe controllers 116, 126 access internal resources directly. It is therefore important that PCIe controllers 116, 126 continuously monitor traffic to protect against cyberattacks, a feature missing from the PCIe specification.

Figure 2:
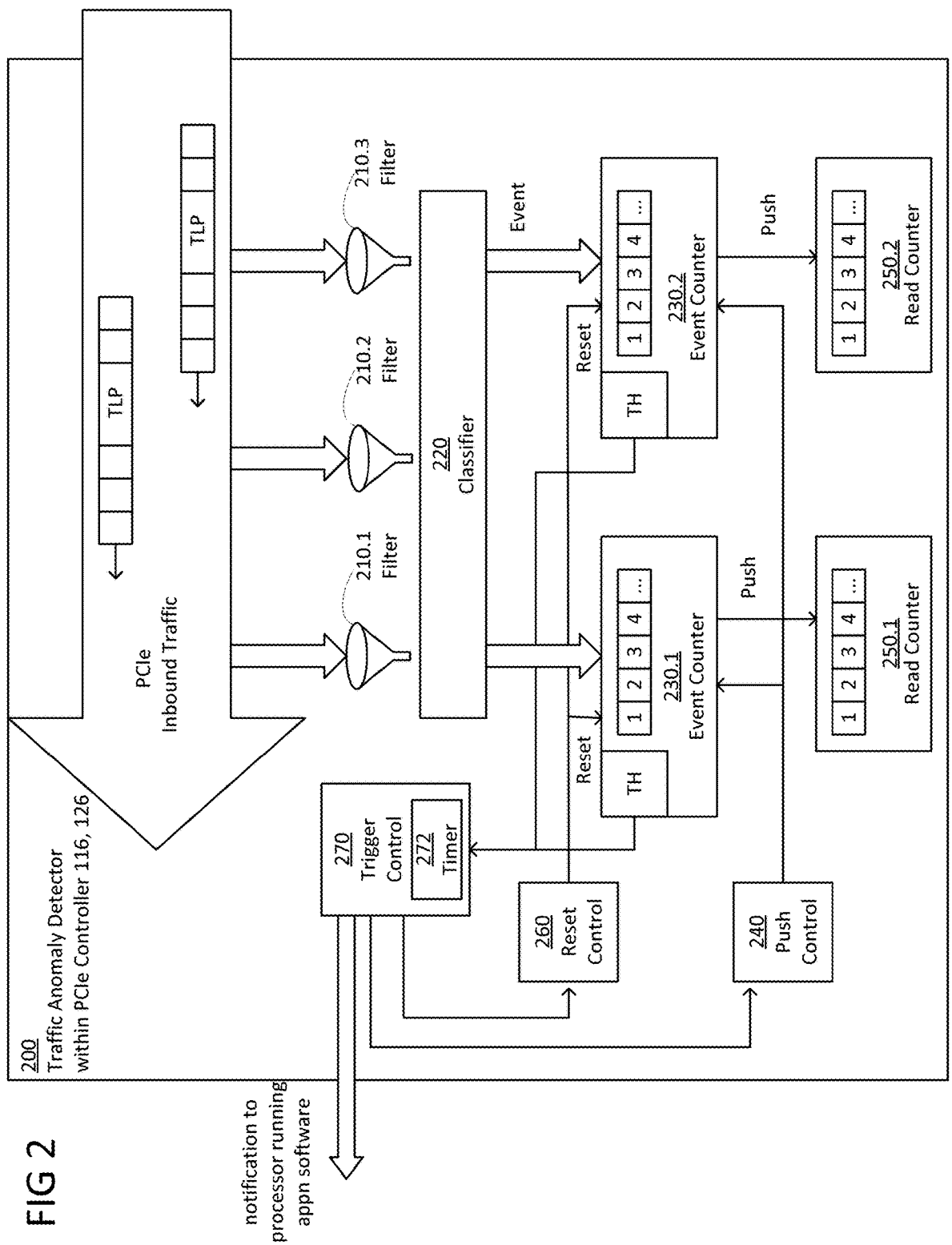
FIG. 2 illustrates a schematic diagram of a traffic anomaly detector of a Peripheral Component Interconnect express (PCIe) controller in accordance with aspects of the disclosure.

FIG. 2 illustrates a schematic diagram of a traffic anomaly detector 200 of a Peripheral Component Interconnect express (PCIe) controller in accordance with aspects of the disclosure.

The traffic anomaly detector 200 comprises one or more filters 210, a classifier 220, one or more event counters 230, a push controller 240, one or more read counters 250, a reset controller 260, and a trigger controller 270.

Inbound transaction layer packets (TLPs) are processed by the PCIe controller 116, 126, which is shown in FIG. 1. In parallel, the TLPs are monitored by the one or more filters 210 implemented to count TLPs that fulfill predefined filter criteria.

The filters 210 are configured to apply the respective filter criterion to fields within the TLP headers. At least one of the filters 210 may be configured to filter a type field or a format field such that only memory TLPs result in a trigger. The respective filter criterion may be selected from the group of fields consisting of type, address, length, and format. For example, a memory write packet (Fmt field) with (i.e., logical AND) an address range from 0x0 to 0xFFFF (Address field). Alternatively, the filters 210 may filter TLPs with a specific requester (i.e., requester ID). There may also be a filter 210 that checks a time interval between two inbound TLPs against a pre-defined limit to detect any loss of TLPs, or alternatively, or an undesirable increase.

The classifier 220 is configured to trigger an event based on one of the filter criterion or a logical combination of a plurality of the filter criteria. For example, a filter 210 may count the inbound TLPs that are memory write TLPs and with addresses from 0x0000_0000 to 0x0000_FFFF. One filter 210 may check the format (Fmt) and the type fields. Another filter 210 may check the address field. Only when both filter criteria are fulfilled, the connected event counter 230 is incremented. The event counters 230 are configured to count a number of the events.

A processor is configured to detect, based on a value of the event counter 230, an anomaly in the PCIe TLP traffic. If a traffic anomaly is detected, the processor may be further configured to initiate a countermeasure.

The trigger controller 270 is configured to read the values of the event counters 230. The trigger controller 270 may notify a monitor when the value of one or more of the event counters 230 exceeds a respective threshold TH. The trigger controller 270 comprises a timer 272, and is further configured to notify a monitor of the value of the event counter periodically.

The trigger controller 270 is optionally configured to trigger the push controller 240 to push values of the plurality of event counters 230 from the plurality of event counters 230 to the respective plurality of read counters 250 simultaneously so that the read counters 250 store a snapshot of all event counters 230. Alternatively, the trigger controller 270 may be configured to trigger the push controller 240 to push values from the one or more event counters 230 to the respective of read counters 250 selectively. This push mechanism allows values to be saved in the read counters 250 while the event counters 230 continue to monitor the inbound TLPs. Application software can read the values from the read counters 250 while the event counters 230 continue counting. This push triggering may be based on time, software control, and/or when the value of the event counters 230 exceeds respective thresholds TH. For example, the push may be activated when there are more than 1,000 memory write TLPs with addresses ranging from 0x0000_0000 to 0x0000_FFFF.

The trigger controller 270 is further configured to trigger the reset controller 260 to reset the event counters 230. The trigger of the reset is similar to that of the push. These resets may occur simultaneously, or alternatively, selectively. The trigger controller 270 may be configured to trigger the reset controller 260 to reset the event counters 230 based on time, software control, or if the value of the event counter exceeds a threshold TH. It is possible to use the same criteria as used to push the values to the read counters 250 to reset the event counters 230. The push and reset action criteria are generally defined by software running on the microcontroller 110, 120. The triggering of the push and reset actions is performed by hardware.

FIG. 3 illustrates an example of a memory write TLP 300. The header is comprised of three 32-bit words 0-2. Each word has four bytes (8 bits). The first three words 0-2 include the header fields, and the fourth word 3 includes the data. The header may include fields such as format, TLP packet type, traffic class information, attributes, TLP digest, end point, data length, request identification, tag, and the like. The disclosure is not necessarily limited by the particular header fields.

FIG. 4 illustrates a flowchart 400 of a method of detecting a traffic anomaly in a PCIe network in accordance with aspects of the disclosure.

At Step 410, filters 210 filter headers of PCIe TLPs based on respective filter criterion.

At Step 420, a classifier 220 triggers an event based on one of the filter criterion or a logical combination of a plurality of the filter criteria.

At Step 430, an event counter 230 counts a number of the events triggered by the classifier 220.

At Step 440, a processor detects, based on a value of the event counter 230, an anomaly in the PCIe TLP traffic. Based on the detected traffic anomaly, the processor may initiate a countermeasure. This countermeasure may include blocking some TLPs.

The techniques of this disclosure may also be described in the following examples.

Example 1. A traffic anomaly detector of a Peripheral Component Interconnect express (PCIe) system, comprising: filters configured to filter headers of PCIe transaction layer packets (TLPs) based on respective filter criterion; a classifier configured to trigger an event based on one of the filter criterion or a logical combination of a plurality of the filter criteria; an event counter configured to count a number of the events; and a processor configured to detect, based on a value of the event counter, an anomaly in the PCIe TLP traffic.

Example 2. The traffic anomaly detector of Example 1, further comprising: a read counter; a push controller; and a trigger controller configured to trigger the push controller to push the value of the event counter from the event counter to the read counter.

Example 3. The traffic anomaly detector of Example 2, wherein the trigger controller is configured to trigger the push controller to push the value of the event counter from the event counter to the read counter based on time, software control, and/or when the value of the event counter exceeds a threshold.

Example 4. The traffic anomaly detector of Example 1, wherein the classifier is configured to trigger the event based a logical combination the plurality of filter criteria.

Example 5. The traffic anomaly detector of Example 1, wherein the classifier is configured to trigger a plurality of events, each of the events based on one of the filter criterion or a logical combination of a plurality of the filter criteria.

Example 6. The traffic anomaly detector of Example 5, further comprising: a plurality of event counters corresponding with the plurality of events; a plurality of read counters corresponding with the respective plurality of event counters; and a trigger controller configured to trigger a push controller to push values of the plurality of event counters from the plurality of event counters to the respective plurality of read counters simultaneously.

Example 7. The traffic anomaly detector of Example 1, further comprising: a trigger controller configured to read the value of the event counter.

Example 8. The traffic anomaly detector of Example 7, wherein the trigger controller is further configured to notify a monitor when the value of the event counter exceeds a threshold.

Example 9. The traffic anomaly detector of Example 7, wherein the trigger controller is further configured to trigger a reset controller to reset the event counter.

Example 10. The traffic anomaly detector of Example 8, wherein the trigger controller is further configured to trigger the reset controller to reset the event counter based on time, software control, or if the value of the event counter exceeds a threshold.

Example 11. The traffic anomaly detector of Example 7, wherein the trigger controller comprises a timer, and the trigger controller is further configured to notify a monitor of the value of the event counter periodically.

Example 12. The traffic anomaly detector of Example 1, wherein one of the filters is configured to filter a type field or a format field such that only memory TLPs result in a trigger.

Example 13. The traffic anomaly detector of Example 1, wherein the respective filter criterion are selected from the group of fields consisting of type, address, length, and format.

Example 14. The traffic anomaly detector of claim 1, wherein if a traffic anomaly is detected, the processor is further configured to initiate a countermeasure.

Example 15. A PCIe controller, comprising: the traffic anomaly detector of Example 1.

Example 16. A method of detecting a traffic anomaly in a Peripheral Component Interconnect express (PCIe) system, comprising: filtering, by filters, headers of PCIe transaction layer packets (TLPs) based on respective filter criterion; triggering, by a classifier, an event based on one of the filter criterion or a logical combination of a plurality of the filter criteria; counting, by an event counter, a number of the events; and detecting, by a processor based on a value of the event counter, an anomaly in the PCIe TLP traffic.

Example 17. The method of Example 16, triggering, by the classifier, the event based a logical combination the plurality of filter criteria.

Example 18. The method of Example 16, further comprising: periodically notifying, by the trigger controller, a monitor of the value of the event counter.

Example 19. The method of Example 16, further comprising: reading, by a trigger controller, the value of the event counter; and notifying a monitor if the value of the event counter exceeds a threshold.

Example 20. The method of Example 16, further comprising: initiating, by the processor, a countermeasure if a traffic anomaly is detected.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A traffic anomaly detector of a Peripheral Component Interconnect express (PCIe) system, comprising:
    filters configured to filter headers of PCIe transaction layer packets (TLPs) based on respective filter criterion;
    a classifier configured to trigger an event based on one of the filter criterion or a logical combination of a plurality of the filter criteria;
    an event counter configured to count a number of the events; and
    a processor configured to detect, based on a value of the event counter, an anomaly in the PCIe TLP traffic.

2. The traffic anomaly detector of claim 1,
    wherein the classifier is configured to trigger the event based a logical combination of the plurality of filter criteria.

3. The traffic anomaly detector of claim 1, wherein one of the filters is configured to filter a type field or a format field such that only memory TLPs result in a trigger.

4. The traffic anomaly detector of claim 1, wherein the respective filter criterion are selected from the group of fields consisting of type, address, length, and format.

5. The traffic anomaly detector of claim 1, wherein if a traffic anomaly is detected, the processor is further configured to initiate a countermeasure.

6. A PCIe controller, comprising:
    the traffic anomaly detector of claim 1.

7. The traffic anomaly detector of claim 1, further comprising:
    a read counter;
    a push controller; and
    a trigger controller configured to trigger the push controller to push the value of the event counter from the event counter to the read counter.

8. The traffic anomaly detector of claim 7, wherein the trigger controller is configured to trigger the push controller to push the value of the event counter from the event counter to the read counter based on time, software control, and/or when the value of the event counter exceeds a threshold.

9. The traffic anomaly detector of claim 1,
    wherein the classifier is configured to trigger a plurality of events, each of the events based on one of the filter criterion or a logical combination of a plurality of the filter criteria.

10. The traffic anomaly detector of claim 9, further comprising:
    a plurality of event counters corresponding with the plurality of events;
    a plurality of read counters corresponding with the respective plurality of event counters; and
    a trigger controller configured to trigger a push controller to push values of the plurality of event counters from the plurality of event counters to the respective plurality of read counters simultaneously.

11. The traffic anomaly detector of claim 1, further comprising:
    a trigger controller configured to read the value of the event counter.

12. The traffic anomaly detector of claim 11, wherein the trigger controller is further configured to trigger a reset controller to reset the event counter.

13. The traffic anomaly detector of claim 11, wherein the trigger controller comprises a timer, and the trigger controller is further configured to notify a monitor of the value of the event counter periodically.

14. The traffic anomaly detector of claim 11, wherein the trigger controller is further configured to notify a monitor when the value of the event counter exceeds a threshold.

15. The traffic anomaly detector of claim 14, wherein the trigger controller is further configured to trigger the reset controller to reset the event counter based on time, software control, or if the value of the event counter exceeds a threshold.

16. A method of detecting a traffic anomaly in a Peripheral Component Interconnect express (PCIe) system, comprising:
    filtering, by filters, headers of PCIe transaction layer packets (TLPs) based on respective filter criterion;
    triggering, by a classifier, an event based on one of the filter criterion or a logical combination of a plurality of the filter criteria;
    counting, by an event counter, a number of the events; and
    detecting, by a processor based on a value of the event counter, an anomaly in the PCIe TLP traffic.

17. The method of claim 16,
    triggering, by the classifier, the event based a logical combination of the plurality of filter criteria.

18. The method of claim 16, further comprising:
    periodically notifying, by a trigger controller, a monitor of the value of the event counter.

19. The method of claim 16, further comprising:
    reading, by a trigger controller, the value of the event counter; and
    notifying a monitor if the value of the event counter exceeds a threshold.

20. The method of claim 16, further comprising:
    initiating, by the processor, a countermeasure if a traffic anomaly is detected.

* * * * *